United States Patent [19]
Beresnev et al.

[11] Patent Number: 5,770,109
[45] Date of Patent: Jun. 23, 1998

[54] FERROELECTRIC LIQUID CRYSTAL CELL

[75] Inventors: Leonid A. Beresnev; Nina I. Chernova; Vladimir G. Chigrinov; Dmitry I. Dergachev, all of Moscow; Alexander V. Ivashchenko, Dolgoprudny; Marina V. Loseva, Moscow; Boris I. Ostrovskiv, Moscow; Arnold Z. Rabinovich, Moscow; Evgeniv P. Pozhidaev, Moscow, all of Russian Federation; Martin Schadt, Seltisberg, Switzerland; Victor V. Titov, Moscow, Russian Federation

[73] Assignee: Rolic AG, Zug, Switzerland

[21] Appl. No.: 862,858

[22] Filed: May 23, 1997

Related U.S. Application Data

[62] Division of Ser. No. 486,610, Jun. 7, 1995, Pat. No. 5,676, 880, which is a continuation of Ser. No. 340,816, Nov. 17, 1994, which is a continuation of Ser. No. 200,939, Feb. 23, 1994, abandoned, which is a continuation of Ser. No. 76,487, Jun. 14, 1993, abandoned, which is a continuation of Ser. No. 964,482, Oct. 21, 1992, abandoned, which is a continuation of Ser. No. 771,824, Oct. 7, 1991, abandoned, which is a continuation of Ser. No. 641,953, Jan. 16, 1991, abandoned, which is a continuation of Ser. No. 243,756, Sep. 13, 1988, abandoned.

[30] Foreign Application Priority Data

| Sep. 18, 1987 | [CH] | Switzerland | 3607/87 |
| Sep. 21, 1987 | [CH] | Switzerland | 3640/87 |
| Sep. 25, 1987 | [CH] | Switzerland | 3722/87 |
| Apr. 26, 1988 | [CH] | Switzerland | 1555/88 |

[51] Int. Cl.$^6$ .................. C09K 19/12; G02F 1/1333
[52] U.S. Cl. .................. 252/299.65; 349/182
[58] Field of Search .................. 252/299.01, 299.65; 349/182

[56] References Cited

U.S. PATENT DOCUMENTS

| 4,966,727 | 10/1990 | Ishihashi et al. | 252/299.61 |
| 4,988,459 | 1/1991 | Scherowsky et al. | 252/299.61 |
| 5,046,830 | 9/1991 | Nakanowatari | 349/172 |
| 5,326,498 | 7/1994 | Kelly | 252/299.61 |
| 5,381,253 | 1/1995 | Sharp et al. | 349/18 |
| 5,393,458 | 2/1995 | Kelly | 252/299.61 |

FOREIGN PATENT DOCUMENTS

| 0 091 661 A1 | 10/1983 | European Pat. Off. . |
| 0 219 480 A2 | 4/1987 | European Pat. Off. . |
| 0 283 916 A2 | 9/1988 | European Pat. Off. . |
| 58-173718 | 10/1983 | Japan . |
| 60-60625 | 4/1985 | Japan . |
| 61-241724 | 10/1986 | Japan . |
| 62-159118 | 7/1987 | Japan . |
| 62-160420 | 7/1987 | Japan . |
| WO 87/06021 | 10/1987 | WIPO . |

OTHER PUBLICATIONS

Clark, et al., *Mol. Cryst. Liq. Crst.*, vol. 94, pp. 213–233 (1983).

Brunet et al., "Optical Properties of a Twisted Smectic C", *Physical Abstracts*, 7(130), pp. C1–321–324, 1982.

(List continued on next page.)

*Primary Examiner*—Shean C. Wu
*Attorney, Agent, or Firm*—Bryan Cave LLP

[57] ABSTRACT

A liquid crystal display cell comprising a chiral ferroelectric smectic liquid crystal layer whose helix structure is influenced by the action of an electric field such that its optical anisotropy alters; a pair of transparent plates between which the liquid crystal is disposed and which have a surface structure for aligning the molecule of the liquid crystal and are provided with electrodes to produce an electric field therein; and one polariser each before and after the liquid crystal: such ratio d/p of the thickness d of the liquid crystal layer to the pitch height p of the helical twisting is greater than 5, the smectic tilt angle $\theta_o$ is being between 22.5 ° and 50° and the product $d.\theta_o^2.\Delta n.1/\lambda$ (phase factor) of the thickness d, the square of the tilt angle $\theta_o$, the value of the birefringence $\Delta n$ and the reciprocal of the wavelength $\lambda$ of light bedding is greater than 0.45 $\mu$m.

1 Claim, 1 Drawing Sheet

OTHER PUBLICATIONS

Lagerwall, et al., *Mol. Cryst. Liq. Crst.,* vol. 114, pp. 151–187 (1984).

Beresnev, et al., "Fast Optoelectronic Switch Using a Type C Smectic Doped With a Chiral Impurity", *American Institute of Physics,* pp. 1296–1297 (1985).

*Patent Abstracts of Japan,* Abstract of Jap. Pat. No. 58–46040, 1982.

*Patent Abstracts of Japan,* Abstract of Jap. Appl. 56–56504, 1983.

*Patent Abstracts of Japan,* Abstract of Jap. Pat. 59–157056, 1984.

Lagerwall, et al., "Ferroelectric Liquid Crystals For Displays" *1985 International Display Research Conference,* IEE–Oct. 85, pp. 213–221.

Ostrovski, et al., "Behavior of Ferroelectric Smectic Liquid Crystals in Electric Field" *Advances in Liquid Crystal Research and Applications,* pp. 469–482 (1980).

F. Allan, "The Optimization of Twisted Nematic Display Thickness", *Information Display* —Oct. 1983, pp. 14 & 16.

F. Sears, et al., "Unit Consistency and Conversions", *University Physics,* Sixth Edition, pp. 4 & 5, 1982.

FERROELECTRIC LIQUID CRYSTAL CELL

This is a divisional of U.S. application Ser. No. 08/486,610, filed Jun. 7, 1995, now U.S. Pat. No. 5,676,880, which is a continuation of U.S. application Ser. No. 08/340,816, filed Nov. 17, 1994, which is a continuation of U.S. application Ser. No. 08/200,939, filed Feb. 23, 1994, now abandoned, which is a continuation of U.S. application Ser. No. 08/076,487, filed Jun. 14, 1993, now abandoned, which is a continuation of U.S. application Ser. No. 07/964,482, filed Oct. 21, 1992, now abandoned, which is a continuation of U.S. application Ser. No. 07/771,824, filed Oct. 7, 1991, now abandoned, which is a continuation of U.S. application Ser. No. 07/641,953, filed Jan. 16, 1991, now abandoned, which is a continuation of U.S. application Ser. No. 07/243,756, filed Sep. 13, 1988, now abandoned.

BACKGROUND OF THE INVENTION

1. Field of the Invention

This invention relates to ferroelectric liquid crystal displays and compounds and mixtures for use in such displays.

More particularly, the invention relates to a liquid crystal display cell having a chiral ferroelectric smectic liquid crystal layer whose helix structure is so influenced by the action of an electric field that its optical anisotropy alters; a pair of transparent plates between which the liquid crystal is disposed and which have a surface structure aligning the molecules of the liquid crystal and are provided with electrodes to produce an electric field therein: and one polariser each before and after the liquid crystal. The invention also relates to chiral or optically active compounds and liquid crystal mixtures for use in the cell and the use of the compounds for electro-optical purposes.

2. Description

The effect of distorting a helix structure of a ferroelectric liquid crystal cell hereinbefore set out by an electric field has been described in Ostrovski, B. I., Advances in Liquid Crystal Research and Applications, Oxford/Budapest. 1960, pp. 469 et seq. The effect is sometimes referred to in the literature by the abbreviation DHF for "distorted helix ferroelectric". The article of Ostrovski considers the possibility of modulating a light beam at a frequency of 1 kHz and using an electric field of less than $6 \times 10^3$ V/cm. Subsequently, however, it was apparently found that this effect does not lead to an electro-optical cell which is usable in practice.

A known effect, but of a different kind, is Lagermall and Clark's surface stabilized ferroelectric liquid crystal (SSFLC) in which ferroelectric liquid crystals are used in an untwisted configuration. This effect has been described in Mol. Crystal. Liq. Crystal. 94 (9183). 213–234 and 114 (1984), 151–187.

SUMMARY

As described hereinbelow, the present invention provides a distorted helix ferroelectric (DHF) cell which has not only the known advantages of the DHF effect but also the properties necessary for practical use as a light shutter or display cell.

According to the invention, this is achieved by a DHF cell of the kind hereinbefore set out wherein the ratio d/p of the thickness d of the liquid crystal layer to the pitch height p of the helical twisting is greater than 5. the smectic tilt angle $\theta_o$ is between 22.5° and 50° and the product $d.\theta_o^2.\Delta n.1/\lambda$ is greater than 0.1 µm. $\Delta n$ denotes the birefringence and $\lambda$ denotes the wavelength of the light.

BRIEF DESCRIPTION OF THE DRAWINGS

Embodiments of the invention will be described hereinafter with reference to the accompanying drawings wherein.

DESCRIPTION OF THE PREFERRED EMBODIMENT

Figure 1:
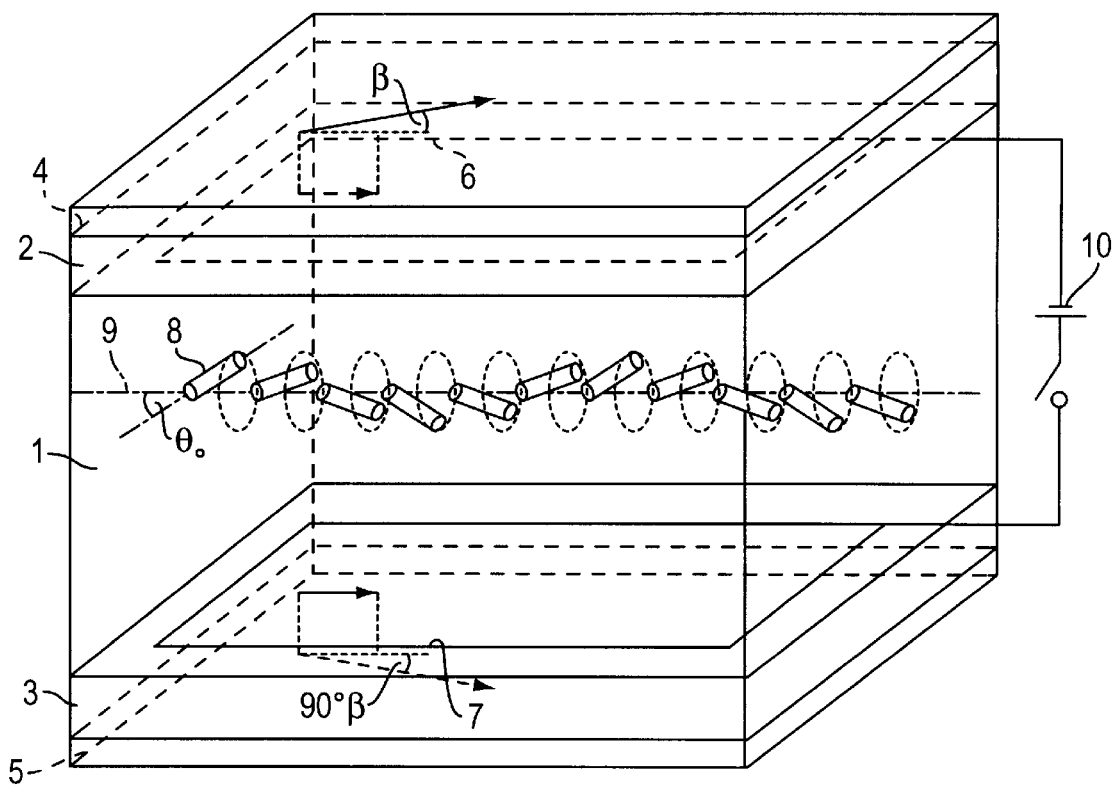
FIG. 1 is a diagrammatic perspective illustration of a small portion of a liquid crystal cell according to a preferred embodiment of the invention.

As shown in FIG. 1. the liquid crystal cell according to the invention comprises a liquid crystal layer 1 disposed between two plates 2, 3 which are disposed in substantially plane-parallel relationship to one another and which are made of a transparent material such as glass, acrylic glass, plastics, foils or the like. A polariser 4 is disposed before the front plate 2 and is preferably disposed or secured thereto, for example, by sticking. This is also known as the input-side polariser. A polariser 5 is correspondingly associated with the rear plate 3. The plates are spaced apart from one another by a distance d (d not indicated on FIG. 1).

The plate surfaces near the liquid crystal have conventional electrode coatings which are segmented to represent characters or image dots. Referring to the cell portion shown in FIG. 1, a single electrode segment 5 is shown on plate 2 and an opposite electrode segment 7 is shown on rear plate 3.

Also, the surfaces near the liquid crystal are so treated by conventional surface aligning technique so as to exert a directional effect on the adjacent liquid crystal molecules and thus to determine the direction of the director. This treatment consists, for example, or rubbing the surface in one direction to produce a planar orientation. Other possibilities are the use of oblique vapor coating of orienting layers, etc. The result of such treatment will be referred to for the purposes of this description as surface orientation. The surface orientation on the two plates is indicated by arrows on FIG. 1. The surface orientation on the rear plate 3 is parallel to that on the front plate so as to obtain the characteristic planar orientation. As well as planar surface orientation, homeotropic orientation or combinations of both can be considered and are contemplated by the invention.

Polariser 4 associated with the front plate is so disposed as to include an angle β with the direction of the surface orientation or with the helix axis of the liquid crystal molecules. Polariser 3 associated with the rear plate is positioned at a 90° offset from the front polariser. This arrangement of the polarisers is a preferred embodiment. Other polariser arrangements which also gives satisfactory results are possible. Appropriate polarizer arrangements of various crossings can readily be determined by simple optimizing by a skilled artisan.

Liquid crystal 1 is a conventional chiral smectic ferroelectric liquid crystal often referred to in the literature as smectic C. Liquid crystals of this kind are known from the literature. Their distinguishing feature is that their molecules are arranged relatively to the smectic planes not perpendicularly but at a particular angle known as the smectic tilt angle $\theta_o$. The chirality resides in that the molecule directions are not parallel to one another in all the layers but are twisted relatively to one another from layer to layer to give overall a helical twisting. In the case of a planar surface orientation, the axis of this helical twisting is aligned parallel to the plates. FIG. 1 shows one molecule 8 per smectic layer and illustrates the helical twisting of the molecules relatively to one another along a helix axis 9, the twisting continuing from layer to layer. The smectic tilt angle $\theta_o$ is the angle between the molecule longitudinal axis and the helix axis 9. When no field is acting on the liquid crystal the pitch height of the helix is $p_o$.

When a potential or voltage is applied to electrodes 6 and 7, an electric field is produced in the liquid crystal which reorientates the molecules. In practice the symbolically indicated voltage source 10 of FIG. 1 delivers periodic signals or trigger pulses which in the case of the present cell may be of opposite polarity, as will be described in detail hereinafter. In its normal state—i.e., in the absence of applied electric filed—the cell has a particular light transmittance. The application of an electric field distorts the helix arrangement of the molecules so that the optical anisotropy and thus the light transmittance is altered. There is an optical contrast between the two states. Basically, the helix structure distortion produced by the electric field alters the pitch height.

Depending on the relationship between light intensity and applied voltage, two different forms of operation are possible in the on state. i.e., linear operation, in which light intensity is directly proportional to the applied voltage, and quadratic operation, in which light intensity is proportional to the square of the voltage.

The effect occurs when the light beam passing through the liquid crystalline structure encounters an aperture <u>a</u> corresponding to a number of periods p of the helical structure. The electrooptical output effect is transmitted in this way along the helix direction.

Figure 2:
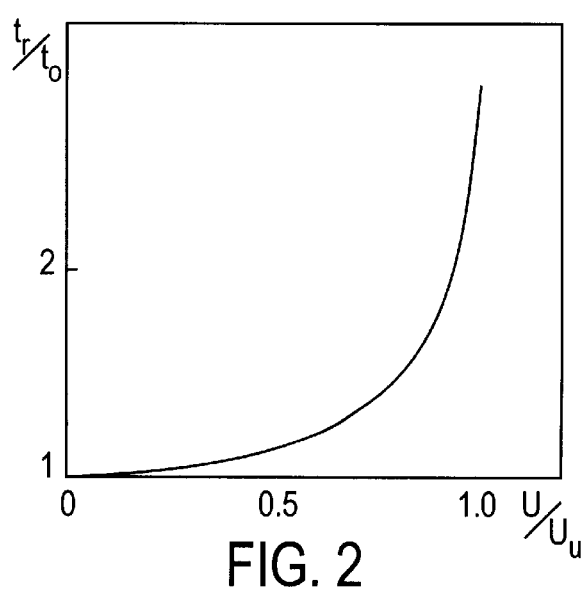
FIG. 2 is a graph in which storage time is plotted against applied voltage.

There are a number of important differences between the effects in which the helical structure is completely cancelled, such as the prior art SSFLC effect, and the effect of the present invention these differences are described below:

1. The operating voltage depends upon the smectic tilt angel $\theta_o$, the polarization in the untwisted state and the ratio $d/p_o$ of layer thickness to pitch height and is usually lower than the voltage Uu required to cancel the helix. The range of operating voltages can be widened by increasing the ration $d/p_o$ and enlarging the smectic tilt angle $\theta_o$.
2. The effect has a satisfactory modulation depth, a high contrast ratio and a grey scale approximately proportional to the applied voltage.
3. The effect permits a storage or memory effect controlled by the amplitude of the applied voltage. This is shown in FIG. 2 wherein on the horizontal axis the applied voltage U relative to the voltage Uu to unwind the helix is given and on the vertical axis the return time $t_r$ for the helical structure to return to the initial state relative to the time $t_o$ for the return from a slightly disturbed to the initial state is given. $t_o$ is a material constant proportional to the $1/p_o^2$. The curve shows that the time ratio increases overproportional with the voltage.

The times $t_o$ and $t_r$ taken for the structure to return to the original undisturbed helix shapes depend upon the viscosity and the elastic constants of the liquid crystal material and upon the pitch height of the helix. The storage time is also affected by surface conditions. For low pitch height values the storage time can be varied from very low values of approximately 10–100 $\mu$sec to high values of 5–10 sec.
4. The effect is based on minor variations of the director orientation and does not alter the disinclination walls in the indication zone. Consequently, there are no delay times in display operation.
5. In the planar configuration the effect is not sensitive to wall orientation. Conventional methods of wall orientation can be used as in nematic liquid crystals.
6. The effect permits the use of biopolar signals and of harmonic fields having a characteristic frequency <u>f</u>.
7. By means of appropriate control signals, optical phase differences can be so produced by the effect in the liquid crystal layer as to facilitate a color change over.

As previously stated, $d/p_o$ ratio parameters of greater than about 5 are preferred, those greater than about 10 being particularly preferred. The smectic tilt angle $\theta_0$ is preferably from about 25° to about 40°. Also, the value of the so-called phase factor $$\frac{d\theta_0^2 \Delta n}{\lambda}$$

is more than abut 0.45 and particularly preferably, more than about 1.

Preferably, the liquid crystal consists of the following mixture: 26.1 wt. % 5-octyl-2-[p-(octyloxy)phenyl] pyrimidine) 17.1 wt. % 5-octyl-2-[p-(nonyloxy)phenyl] pyrimidine) 24.5 wt. % 5-octyl-2-[p-(decyloxy)phenyl] pyrimidine) 32.3 wt. % of the chiral additive:

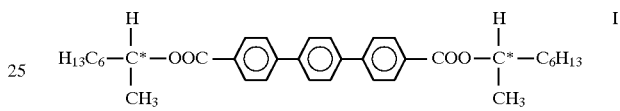

As a rule, there can be used as chiral additives compounds having the formula:

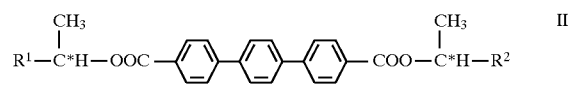

wherein $R^1$ and $R^2$ denote independently of one another alkyl having at least 2 to 20 carbon atoms and each C* denotes a chiral carbon atom.

The formula I and formula II compounds are novel and also are the subject of this invention. They induce a very high spontaneous polarization in the liquid crystal mixture and are chemically stable, colorless and readily soluble in conventional liquid crystal materials, more particularly in ferroelectric smectic liquid crystals.

The term "alkyl having at least 2 carbon atoms" covers straigh-chain and branched groups, more particularly straigh-chain alkyl having at least 2 carbon atoms and isoalkyl, such as ethyl, propyl, isopropyl, butyl, isobutyl, pentyl, hexyl, heptyl, octyl, nonyl or the like. The alkyl groups $R^1$, $R^2$ preferably each have 2–15, particularly preferably 2–9. carbon atoms. $R^1$ and $R^2$ may have different significance but preferably have the same significance.

The configuration at the chirality centers in formula II is preferably such that the chiral groups induce a spontaneous polarization in the same sense. Preferably, the two chiral carbon atoms are present in S-configuration or in R-configuration, more particularly when $R^1$ and $R^2$ have the same significance.

The formula II compounds can be prepared in a known manner by conventional esterification methods from 4,4"-p-terphenyldicarboxylic acid and 2-alkanols. The starting material are known compounds, analogues of known compounds or can be made from known compounds by convention techniques.

The formula II compounds are particularly suitable as chiral doping agents for liquid crystalline mixtures. The invention therefore also relates to a liquid crystalline mixture having at least two components, characterized in that at least one component is an optically active formula II compound. Preferably, the mixture contains a liquid crystal material having a tilted smectic phase and one or more optically active formula II compounds.

The proportion of formula II compounds in the mixtures according to the invention can vary within wide limits and can be, for example, approximately from about 0.5 to about 30 wt. %. A range of approximately 1–10 wt. %. is generally preferred and a range of approximately from about 3 to about 10 wt % is particularly preferred.

The liquid crystal material having a tilted smectic phase can consist of conventional materials. Materials having a smectic C-phase, such as derivatives of phenylpyrimidine, phenylpyridine, phenylbenzoate, benzoate acidbiphenylester and 4-biphenylcarboxylic acid-phenylester having a smectic C-phase are preferred.

In a preferred cell having this liquid crystal mixture, the pitch height $p_o$ is about 0.3 to about 0.4 µm at 25° C. and the birefringence $\Delta n$ is about 0.25. The smectic tilt angel $\theta_o$ is approximately about 29° at room temperature (about 20° C.). The spontaneous polarization $P_s$ is approximately $7.10^{-9}$ c/cm$^2$ at 25° C. Rotation viscosity is approximately 1 poise. The liquid crystal layer in the cell has a thickness of about 3.6 µm. The voltage Uu needed for complete cancellation of the helix structure is approximately 2 V. The response time for this cell is approximately 200 µsec. The response time for the entire applied voltage range 0<U<Uu is approximately of the same length.

The approximate preferred values for the angel β are β=22.5° (π/8) or β=67.5° (3π/8) for linear operation) and β=0°, β=45° (π/8), or β=90° (π/2) for quadratic operation.

The resulting cell provides a contrast of more than 100:1. The following table lists the intensity values I for a series of voltage amplitudes by using the inventive cell. The voltage is in the form of rectangular pulses. The values are for linear operation.

TABLE

| U [V] | I [%] |
|---|---|
| 0 | 1 |
| 0.15 | 10 |
| 0.25 | 20 |
| 0.45 | 35 |
| 0.5 | 55 |
| 1.0 | 90 |
| 1.5 | 99 |
| 1.75 | 98 |
| 2.0 | 97 |
| 2.45 | 80 |
| 2.6 | 65 |
| 2.95 | 50 |
| 3.3 | 40 |
| 4.0 | 35 |
| 5.15 | 35 |

The maximum intensity value is 100%. The first values in the 0–2 volts voltage range indicate the obtainable grey scale. Contrast decreases above 2 volts due to the higher smectic tilt angle. The helix unwinds completely at voltages above 4.0 volts.

The preparation of formulation II compound will be described hereinafter with reference to the following example.

EXAMPLE 1

A solution of 2 g of 4,4"-p-terphenyldicarboxylic acid dichloride (which can be prepared by conventional techniques by reacting 4,4"-p-terphenyldicarboxylic acid with thionyl chloride in pyridine at 80° C.) in 200 cc of dry pyridine was mixed with 1.59 g of S-(+)-2-oxtanol and agitated at 20° C. for 24 hours. This reaction mixture was then poured onto a mixture of ice and dilute dydrochloric acid. The crystalline product is filtered off, washed in water and dried in a high vacuum. Chromatographic purification and recrystallization yielded pure 4,4"-Di-[2(S)-octyloxy-carbonyl]-p-terphenyl with a melting point of 81°–82° C.

The following compounds can be prepared similarly:
4,4"-di-[2(S)-octyloxycarbonyl]-p-terphenyl:
4,4"-di-[2(R)-octyloxycarbonyl]-p-terphenyl;
4,4"-di-[2(S)-heptloxycarbonyl]-p-terphenyl;
4,4"-di-[2(R)-heptloxycarbonyl]-p-terphenyl;
4,4"-di-[2(R)-octyloxycarbonyl]-p-terphenyl; melting point 81°–82° C.:
4,4"-di-[2(S)-nonyloxycarbonyl]-p-terphenyl;
4,4"-di-[2(R)-nonyloxycarbonyl]-p-terphenyl;
4,4"-di-[2(S)-decyloxycarbonyl]-p-terphenyl:
4,4"-di-[2(R)-decyloxycarbonyl]-p-terphenyl;

Spontaneous polarization Ps was examined by means of a mixture of 5 wt. % 4,4"-di-[2(S)-octyloxycarbonyl]-p-terphenyl and 95 wt. % 4-octyloxybenzoic acid-4-hexyloxyphenylester. The mixture had a Ps value of 8.8 nC/cm$^2$ at 40° C. The extrapoated Ps value for 4,4"-di-[2 (S)-octyloxycarbonyl]-p-terphenyl is 176 nC/cm$^2$ at 40° C.

While the invention has been described in conjunction with certain embodiments, it is understood that various modifications and changes may be made with out departing from the spirit and scope of the invention.

We claim:

1. An electro-optical cell comprising:
   a) front and rear transparent plate means;
   b) means for applying an electric potential to the plate means
   c) a chiral ferroelectric smectic liquid crystal disposed between the plate means and having a helical structure which is influenced by the action of the electrical potential means so as to alter its optical anisotropy; and
   d) surface orientation means disposed on each surface of the plate means adjacent the liquid crystal so as to align the molecules of the liquid crystal in a predetermined manner; and
   e) front and rear polarisers disposed respectively on the surface of the front and rear plate means opposite to the surface of orientation means;

such that the ratio of d/p of the thickness d of the liquid crystal to the pitch height p of the helical twisting is greater than about 5, the smectic tilt angle $\theta_o$ is between about 22.5° and about 50° and the product of the thickness d, the square of the tilt angle $\theta_o$ and the value of the birefringence $\Delta n$ and the reciprocal of the wavelength λ of light (phase factor) is greater than about 0.45 µm, and wherein the liquid crystal comprises the following mixture 26.1 wt. % 5-octyl-2-[p-(octyloxy) phenyl] pyrimidine, 17.1 wt. % 5-octyl-2-[p-(nonyloxy) phenyl] pyrimidine, 24.5 wt. % 5-octyl-2-[p-(decyloxy) phenyl] pyrimidine, 32.3 wt. % of the chiral additive of the formula:

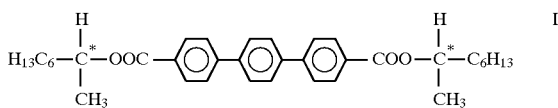

* * * * *

UNITED STATES PATENT AND TRADEMARK OFFICE
CERTIFICATE OF CORRECTION

PATENT NO. : 5,770,109

DATED : June 23, 1998

INVENTOR(S) : Leonid A. Beresnev, et al.

It is certified that error appears in the above-identified patent and that said Letters Patent hereby corrected as shown below:

Title page [75]   change "Ostrovskiv" to --Ostrovskiy--.

Title page   under [56] References Cited, U.S. Patent Documents, the following U.S. Patents were incorrectly omitted by the Patent Office:

| | | |
|---|---|---|
| 3,972,587 | 8/1976 | Scheffer |
| 4,586,791 | 5/1986 | Isogai et al. |
| 4,592,623 | 6/1986 | Yamamoto et al. |
| 4,668,051 | 5/1987 | Mourey et al. |
| 4,715,688 | 12/1987 | Harada et al. |
| 4,753,752 | 6/1988 | Raynes et al. |
| 4,813,767 | 3/1989 | Clark et al. |
| 4,832,462 | 5/1989 | Clark et al. |
| 4,852,978 | 8/1989 | Davey et al. |
| 4,917,475 | 4/1990 | Meyer et al. |
| 4,927,244 | 5/1990 | Bahr et al. |

Signed and Sealed this

Fourth Day of April, 2000

Attest:

*Attesting Officer*

Q. TODD DICKINSON

*Director of Patents and Trademarks*